United States Patent
Sakamoto

(10) Patent No.: US 6,321,806 B1
(45) Date of Patent: Nov. 27, 2001

(54) PNEUMATIC TIRE WITH RIM FLANGE HOLDER

(75) Inventor: Masayuki Sakamoto, Shirakawa (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 09/527,262

(22) Filed: Mar. 17, 2000

(30) Foreign Application Priority Data

Mar. 18, 1999 (JP) .................................. 11-073227

(51) Int. Cl.⁷ .................. B60C 3/00; B60C 13/02; B60C 15/02; B60C 15/024; B60C 17/00
(52) U.S. Cl. .................. 152/165; 152/454; 152/516; 152/523; 152/544; 152/DIG. 9
(58) Field of Search ...................... 152/513, 523, 152/544, 165, 166, 454, 516, DIG. 9

(56) References Cited

U.S. PATENT DOCUMENTS

| | | | |
|---|---|---|---|
| 2,874,745 | * 2/1959 | Wann | 152/523 |
| 4,057,092 | * 11/1977 | Tracy | 152/523 X |
| 4,365,659 | * 12/1982 | Yoshida et al. | 152/544 X |

FOREIGN PATENT DOCUMENTS

253413 * 2/1963 (AU) ..................... 152/544

\* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire, which is adapted for a standard wheel rim, comprises a tread portion, a pair of sidewall portions, a pair of bead portions, a carcass extending between the bead portions, and a rim flange holder disposed on each side of the tire and protruding axially outwardly so as to overhang a flange of the standard wheel rim. The rim flange holder has a hooking part extending radially inwardly on the axially outside of the flange so as to hook the flange. The radial measurement between the radially outermost point of the flange and the radially innermost point of the hooking part is at least 2 mm, and the rim flange holder is provided with a slit extending axially inwardly from the axial outer surface of the rim flange holder.

7 Claims, 4 Drawing Sheets

PNEUMATIC TIRE WITH RIM FLANGE HOLDER

BACKGROUND OF THE INVENTION

1. Field of the Invention

The present invention relates to a pneumatic tire used together with a standard wheel rim, more particularly to an improved sidewall structure which can minimize bead unseating during the use of the tire, especially in the uninflated state.

2. Description of the Related Art

If the inner pressure of tire is decreased due to punctures and the like, the bead portions of the tire easily dislocate from the bead seats of the wheel rim and, at worst, the bead portions get over the rim flange.

In order to avoid such a dangerous situation, a special wheel rim has been proposed. However, in such a special wheel rim, it is difficult to mount and demount the tire. Therefore, the special rims hardly[]come into the market.

BRIEF SUMMARY OF THE INVENTION

An object of the present invention is therefore to provide a pneumatic tire, in which accidental bead unseating can be minimized without using a special wheel rim which usually pose difficulties in mounting and demounting the tire.

According to the present invention, a pneumatic tire which is adapted for a standard wheel rim, comprises a tread portion, a pair of sidewall portions, a pair of bead portions, a carcass extending between the bead portions, a rim flange holder disposed on each side of the tire and protruding axially outwardly so as to overhang a flange of the standard wheel rim, the rim flange holder having a hooking part extending radially inwardly on the axially outside of the flange so as to hook the flange, the radial measurement between the radially outermost point of the flange and the radially innermost point of the hooking part being at least 2 mm, and the rim flange holder provided in the axial outer surface thereof with a slit extending axially inwardly therefrom.

Therefore, the bead portion can be prevented from dislocating axially inwards as the rim flange holder hooks the rim flange, and bead unseating in the uninflated state can be prevented.

Further, the slit can decrease a force which moves the hooking part radially outwards when the sidewall portion is inclined axially inwards as shown in FIG. 3. Accordingly, bead unseating caused during cornering in the uninflated state can be effectively prevented.

Furthermore, the slit makes it relatively easy to change the shape of the rim flange holder during mounting the tire on the wheel rim. Accordingly, bead rotation about the bead toe becomes relatively easy. Therefore, the efficiency of mounting operation can be prevented from decreasing.

BRIEF DESCRIPTION OF THE DRAWINGS

Embodiments of the present invention will now be described in detail in conjunction with the accompanying drawings.

DETAILED OF THE INVENTION

Figure 1:
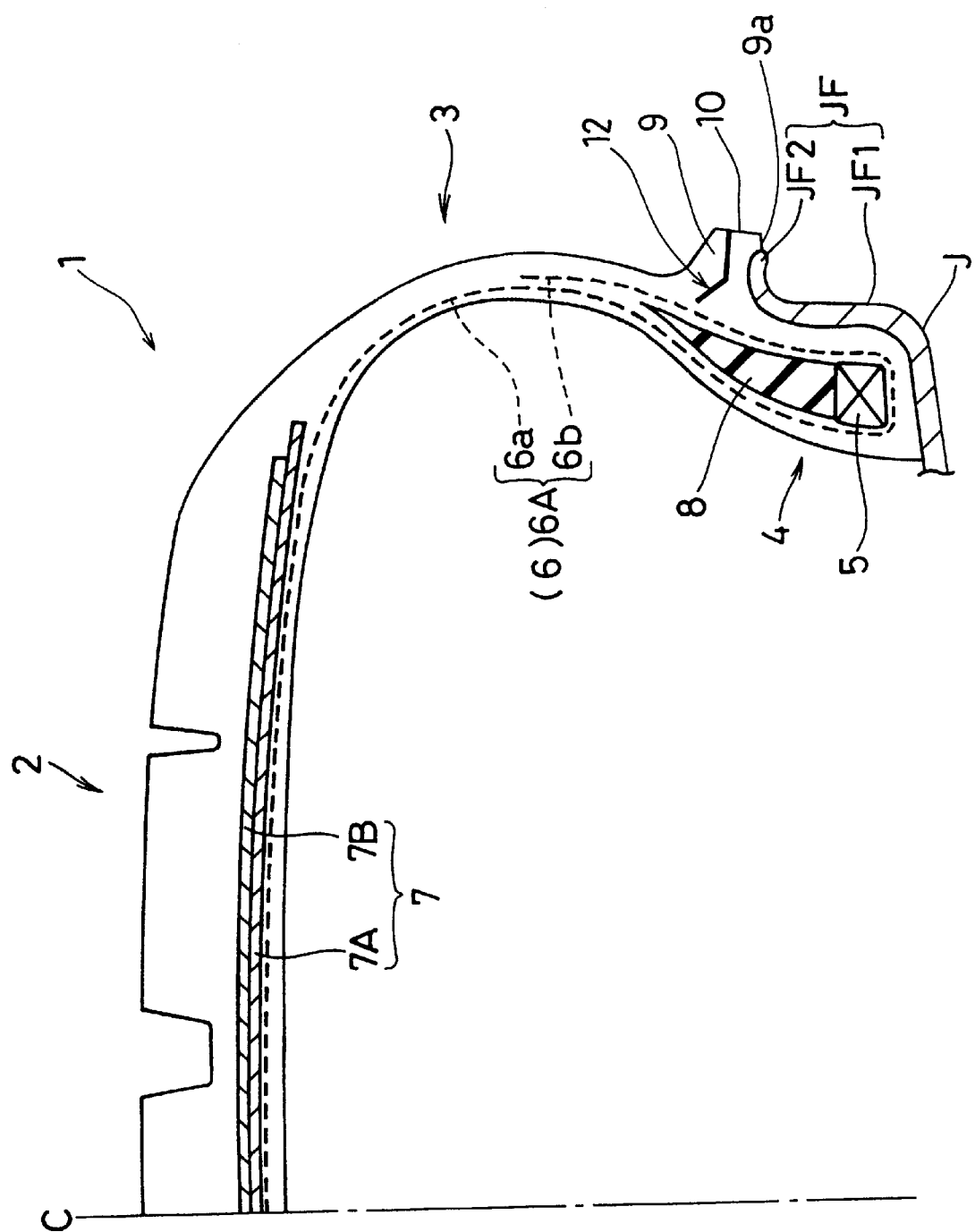
FIG. 1 is a cross sectional view of a pneumatic tire according to the present invention.

In the drawings, a pneumatic tire 1 according to the present invention comprises a tread portion 2, a pair of bead portions 4 each with a bead core 5 therein, a pair of sidewall portions 3, a carcass 6 extending between the bead portions 4 through the tread portion 2 and sidewall portions 3, and a rim flange holder 9 disposed on each of the sidewall portions 3.

In FIG. 1, the tire 1 is a passenger car tire having an aspect ratio of not more than 50%, and shown is only a right half, but a left half has the same structure. In other words, apart from the tread pattern, the tire is symmetrical about the tire equator C.

FIG. 1 shows a normally inflated unloaded state of the tire 1 which is mounted on a standard rim and inflated to a standard inner pressure but loaded with no tire load.

Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The standard wheel rim J comprises a pair of bead seats JS for seating the bead portions 4 each disposed on one side of a rim well, and a pair of rim flanges JF each extending radially outwardly from one of the bead seats JS. Usually and in this embodiment, the rim flange JF comprises a substantially straight inner part JF1 extending radially outwardly from the axially outer end of the bead seat JS, and a curved outer part JF2 extending axially outwardly from the straight inner part JF1.

The carcass 6 is composed of at least one ply 6A, in this example only one ply of cords arranged radially at an angle of 75 to 90 degrees with respect to the tire equator C. The carcass ply 6A extends between the bead portions 4 and is turned up around the bead core 5 in each bead portion from the axially inside to the axially outside of the tire to form a pair of turned up portions 6b and a main portion 6a therebetween. For the carcass cords, organic fiber cords, e.g. polyester, nylon, rayon and the like are preferably used, but steel cords may be used as well.

The tread portion 2 is provided radially outside the carcass 6 with a belt. The belt comprises a breaker 7 and optionally a band. The breaker 7 comprises at least two cross plies 7A and 7B of high elastic modulus cords such as steel cords laid at an angle of from 10 to 40 degrees with respect to the tire equator C. The band is usually disposed radially outside the breaker 7 and composed of parallel cords or windings of at least one cord, the cord angle of which is less than 10 degrees with respect to the tire equator C. For the band cords, organic fiber cords having a relatively low elastic modulus are usually used.

Each of the bead portions 4 is provided between the turned up portion 6b and the main portion 6a of the carcass ply 6A with a bead apex 8 made of hard rubber extending radially outwardly from the bead core 5.

Figure 2:
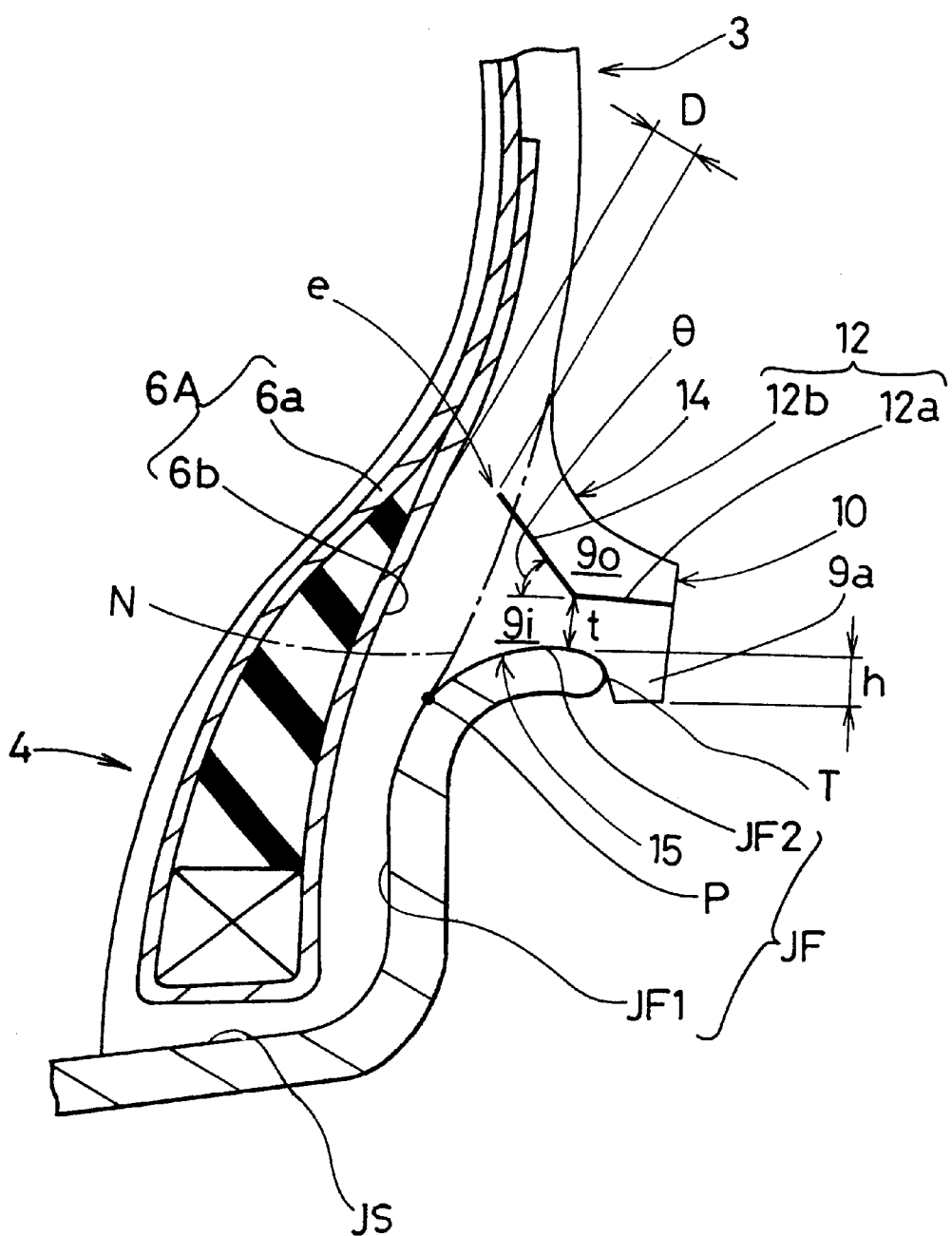
FIG. 2 is an enlarged cross sectional view of the bead portion thereof.
Figure 3:
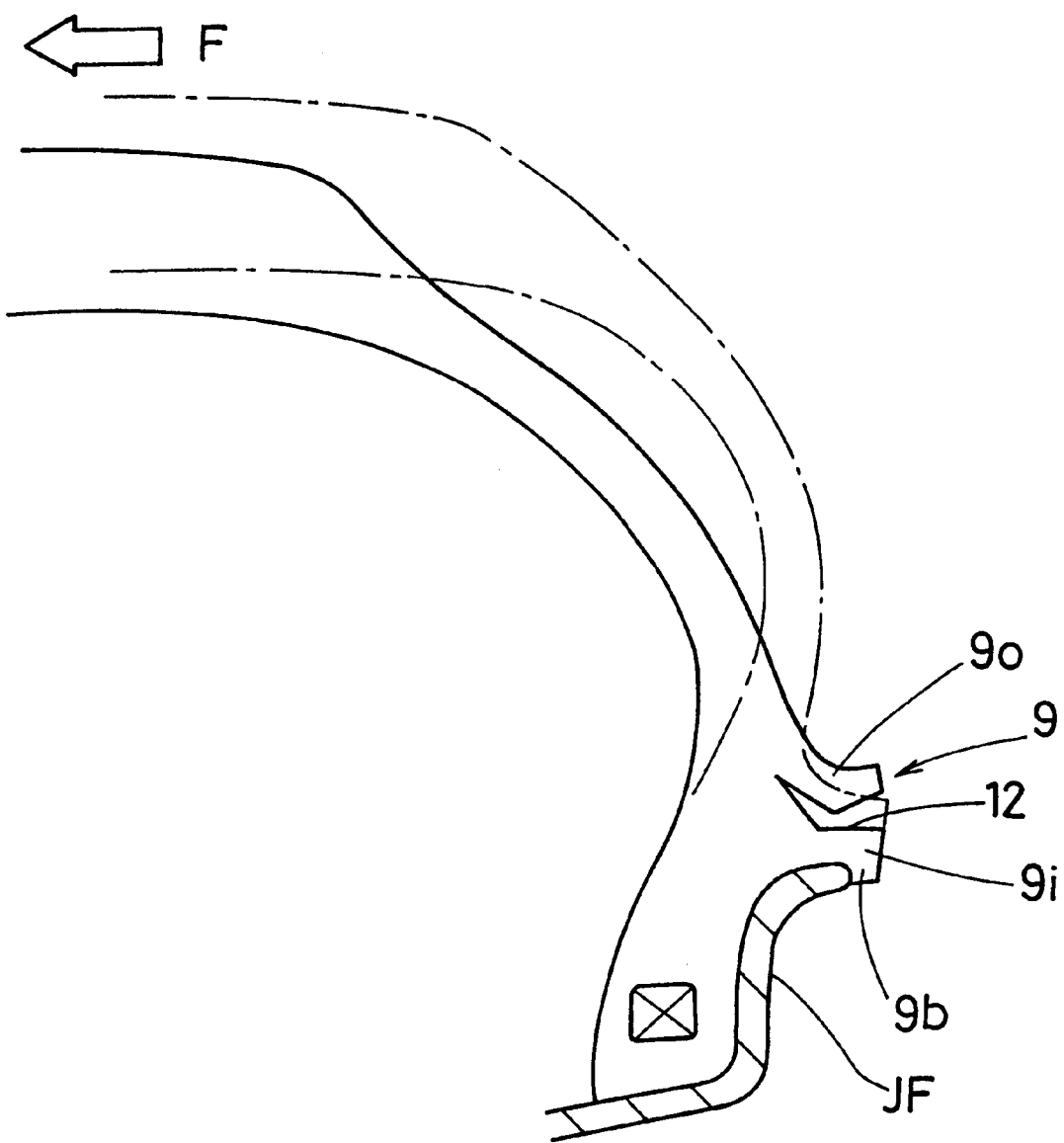
FIG. 3 is a schematic cross sectional view of the tire which is deformed by a lateral force applied to the tread portion.

The above-mentioned rim flange holder 9 is disposed on each side of the tire and extends continuously in the tire circumferential direction. The rim flange holder 9 is preferably made of a hard rubber compound same as or similar to a clinch rubber disposed along the surface of the bead portion 4 rather than a softer sidewall rubber disposed along the surface of the sidewall portion 3. As shown in FIG. 2, the rim flange holder 9 protrudes axially outwardly beyond the axially outer end T of the rim flange JF so as to overhang the rim flange JF. And the rim flange holder 9 has a hooking part 9a at the axially outer end.

On the axially outside of the axially outer end T of the rim flange JF, the hooking part 9a extends radially inwardly by a certain distance (h) from the radially outer end of the rim flange JF. The distance (h) is preferably set in the range of not less than 2 mm when measured, under the above-mentioned normally inflated unloaded state, from the radially outermost point of the rim flange JF to the radially innermost point of the hooking part 9a in the radial direction of the tire.

The rim flange holder 9 has an axially outer surface 10, a radially outer surface 14 and a radially inner surface 15.

The radially outer surface 14 is curved concavely, and the axially inner end thereof is merged into the outer surface of the sidewall portion 3. But, the axially outer end thereof is not merged into the axially outer surface 10. An angled corner is formed therebetween. At the axially outer end, the inclination angle is almost zero or a small positive value with respect to the tire axial direction.

The axially outer surface 10 in this example is substantially flat and substantially parallel to the tire equatorial plane. But it is also possible to somewhat curve and/or incline the outer surface 10.

The radially inner surface 15 is also curved concavely, and the axially inner end thereof is merged into the outer surface of the bead portion 4.

Under the above-mentioned normally inflated unloaded state of the tire, the radially inner surface 15 preferably contacts with the rim flange JF as shown in FIG. 2. However, a narrow gap may be allowed between the rim flange holder 9 and the curved outer part JF2 especially on the axially outside of a point P. The point P is a contacting point of the standard rim J and the outer surface of the conventional tire. The axial distance between the axially outer end T of the rim flange JF and the axially inside of the hooking part 9a is substantially zero. The contour is so defined according to the contour of the rim flange.

Further, the rim flange holder 9 is provided with a slit 12 to divide the rim flange holder 9 into a radially outer part 9o and a radially inner part 9i. The axially outer end of the slit 12 opens at the axial outer surface 10 of the rim flange holder 9, but the axially inner end (e) thereof is terminated before the axially outer carcass cords so that the minimum distance D between the inner end (e) and the carcass cords becomes at least 2 mm. Further, the minimum thickness (t) of the inner part 9i is at least 1.5 mm. The width of the slit 12 is preferably set in the range of from 0.3 to 3.0 mm.

In FIG. 2, the slit 12 is made up of: an axially outer part 12a extending axially inwards from the axially outer surface 10 in substantially parallel with the tire axial direction; and an axially inner part 12b extending from the axially inner end of the outer part 12a to the above-mentioned inner end (e) while inclining radially outwards at an angle θ.

The slit 12 has a constant width from the outer end to the inner end (e).

The inclination angle θ is set in the range of from 45 to 80 degrees, preferably 50 to 65 degrees with respect to the tire axial direction.

In FIG. 2, the imaginary line N shows a contour of a conventional tire. The slit 12 extends beyond this line N. If the inner end (e) is located on the axially outside of the imaginary line N, the rigidity increases around the rim flange holder 9 and it becomes difficult to mount the tire on the rim. The axially inner end of the axially outer part 12a of the slit 12 is positioned at an axial position corresponding to the radially outermost point on the curved outer part JF2 of the rim flange.

Figure 4:
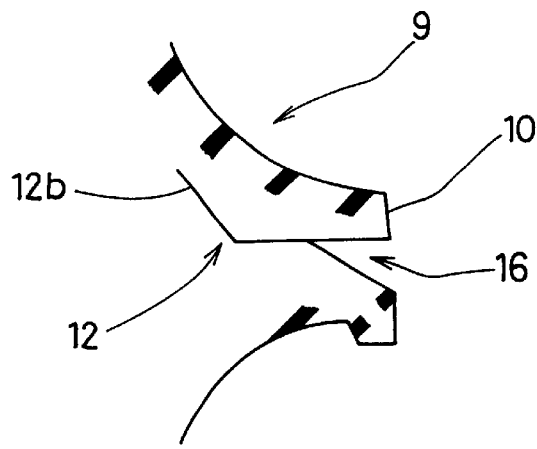

FIG. 4 shows a modification of the rim flange holder 9 shown in FIG. 2, wherein the width of the slit 12 varies. The width is maximum at the axially outer end, and decreases axially inwards therefrom at a substantially constant rate, and the width reaches to zero at an axial position which substantially corresponds to that of the radially outermost point of the rim flange JF. This widening part 16 can improve the ride comfort during normal running and the tire mounting operation.

Figure 5:
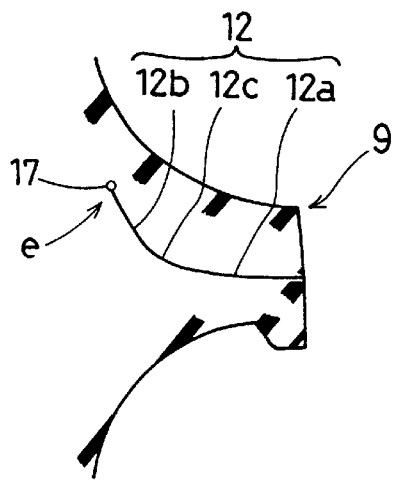
FIGS. 4 to 8 are cross sectional views each showing another example of the rim flange holder.

FIG. 5 shows a modification of the slit 12 shown in FIG. 2, wherein a curved middle part 12c is formed between the axially outer part 12a and the axially inner part 12b. These parts are connected without forming an inflection. Further, the slit 12 is provided at the axially inner end (e) with an expanded part 17 of which cross section is circular. Aside from this expanded part 17, the slit has a constant width of near zero.

Figure 6:
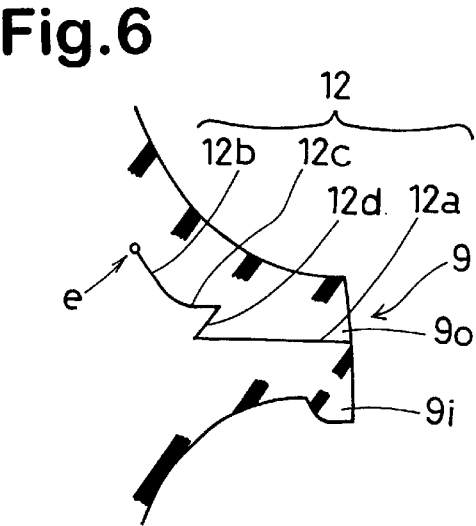

FIG. 6 shows a modification of the slit 12 shown in FIG. 5, wherein the slit 12 extends zigzag in the middle of the length. A zigzag segment 12d, which is formed between the axially inner part 12b and the curved middle part 12c in this example, is inclined reversely to the axially inner part 12b, and the inclination angle is set in the numerically same range as the angle θ.

Figure 7:
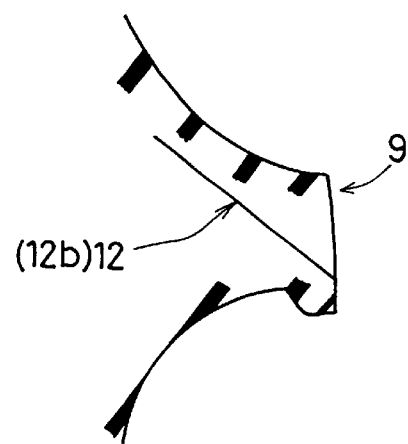

FIG. 7 shown another example of the slit 12, wherein the whole of the slit 12 is inclined at the angle θ.

Figure 8:
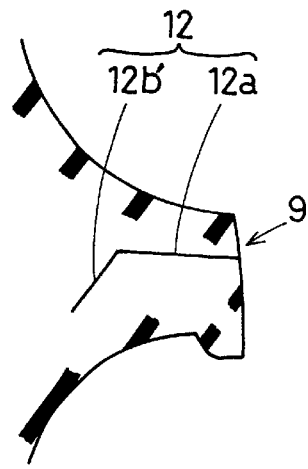

FIG. 8 shows a modification of the slit 12 shown in FIG. 2, wherein the slit 12 comprises the axially outer part 12a and an axially inner part 12b' inclined radially inwards. The inclination angle thereof is set in the numerically same range as the angle θ. Alternatively, the whole of the slit 12 may be so inclined.

In the above-mentioned examples, each rim flange holder 9 is provided with a single slit 12, but it may be possible to provide two or more slits 12 in parallel relationship. In case of a single slit, the slit is usually continuous in the tire circumferential direction. But, it may be possible to provide broken parts.

Comparison Tests

Test tires of size 225/50R16 having the same structure shown in FIG. 1 except for the rim flange holder were made and tested for the resistance to bead unseating and the difficulty in mounting the tire on a standard rim.

1) Resistance to bead unseating test: A test car provided with a test tire made a U-turn ten times to obtain the number of occurrence of bead unseating. (Turning radius 25 meters, Initial speed 40 km/hr, Tire pressure 0.5 kgf/sq.cm)

2) Tire Mounting test: Using a hand tool (tire lever), the test tires were mounted on a standard rim, and the degree of difficulty was evaluated by a skilled person.

The test results and the specifications of the tires are shown in Table 1.

TABLE 1

| Tire | Ref. 1 | Ref. 2 | Ex. 1 | Ex. 2 | Ex. 3 | Ex. 4 |
|---|---|---|---|---|---|---|
| Rim flange holder | none | *1 | | | | |
| h (mm) | — | 0 | 2.5 | 2.5 | 2.5 | 2.5 |
| Slit | — | none | FIG. 2 | FIG. 2 | *2 | FIG. 4 |
| Width (mm) | — | — | 0.5 | 0.5 | 0.5 | 0.5 to 3.0 |
| Angle θ (deg.) | — | — | 45 | 75 | — | 45 |
| Test results | | | | | | |
| Resistance to bead unseating | 10 | 10 | 3 | 2 | 2 | 2 |
| Difficulty in mounting *3 | A | A | A | A | B | A |

*1) Hooking part was omitted.
*2) The whole of the slit was parallel to the tire axial direction.
*3) A: good, B: a little difficult, X: very difficult From the tests, it was confirmed that, in the example tires according to the present invention, bead unseating can be effectively prevented without posing difficulties in mounting the tire on the standard rim.

What is claimed is:

1. A pneumatic tire adapted for a standard wheel rim, the tire comprising a tread portion, a pair of sidewall portions, a pair of bead portions, a carcass extending between the bead portions, a rim flange holder disposed on each side of the tire and protruding axially outwardly so as to overhang a flange of the standard wheel rim, the rim flange holder having a hooking part extending radially inwardly on the axially outside of the flange so as to hook the flange, the radial measurement between the radially outermost point of the flange and the radially innermost point of the hooking part being at least 2 mm, and the rim flange holder provided in the axial outer surface thereof with a slit extending axially inwardly therefrom.

2. The pneumatic tire according to claim 1, wherein the minimum distance between the axial inner end of the slit and the carcass is at least 2 mm.

3. The pneumatic tire according to claim 1 or 2, wherein the slit is at least partially inclined at an angle θ of from 45 to 80 degrees with respect to the tire axial direction.

4. The pneumatic tire according to claim 1 or 2, wherein the slit comprises an axially outer part extending substantially parallel to the tire axial direction and an axially inner part inclined radially outwards at an angle θ of from 45 to 80 degrees with respect to the tire axial direction.

5. The pneumatic tire according to claim 1 or 2, wherein the slit comprises an axially outer part extending substantially parallel to the tire axial direction and an axially inner part inclined radially inwards at an angle θ of from 45 to 80 degrees with respect to the tire axial direction.

6. The pneumatic tire according to claim 1 or 2, wherein the slit is inclined radially outwards in its full length, and the inclination angle θ thereof is in the range of from 45 to 80 degrees with respect to the tire axial direction.

7. The pneumatic tire according to claim 1 or 2, wherein the slit is inclined radially inwards in its full length, and the inclination angle θ thereof is in the range of from 45 to 80 degrees with respect to the tire axial direction.

\* \* \* \* \*